Jan. 19, 1965  N. E. DARLING  3,166,044
DEVICE FOR RELEASING COWS
Filed March 28, 1963

INVENTOR
NORMAN E. DARLING
BY Fred L. Witherspoon, Jr. and
Fred E. Shoemaker
ATTORNEYS

# United States Patent Office 3,166,044
Patented Jan. 19, 1965

3,166,044
DEVICE FOR RELEASING COWS
Norman E. Darling, Warren Center, Pa.
Filed Mar. 28, 1963, Ser. No. 268,616
2 Claims. (Cl. 119—27)

This invention relates to animal stalls and more particularly to gate means for mechanically opening one or more stalls in a stall system in a simple and efficient manner.

In recent years there has been a trend toward holding cows by straps around the neck in common tie stalls or in another similar and suitable manner. This has been done because of the increased freedom and comfort presently allowed the cows in such stall arrangements. However, this has presented at least one troublesome labor problem because each cow must be secured in the stall and released therefrom individually. This is an especially serious problem when a stall barn is combined with milking parlors because it is necessary to let the cows in and out twice daily for milking.

In order to overcome this, a mechanically operated stall gate system has been devised whereby any and all of the stalls may be mechanically and simultaneously opened and closed.

In view of the foregoing it is an object of this invention to provide a stall system with mechanically operated gates for opening and closing the stalls.

It is another object to provide a gate system for a plurality of stalls whereby the stalls may be selectively opened and closed.

It is a further object to provide a stall gate which is simple in structure and readily adaptable to many existing stall systems.

It is yet another object to provide a gate at the rear of a stall wherein the gate is mounted on a horizontal axis for rotation therearound to open and close the stall.

The above and other objects of this invention will become more apparent when taken in conjunction with the following detailed description and drawing, showing by way of example, a preferred embodiment of the invention.

Figure 1:
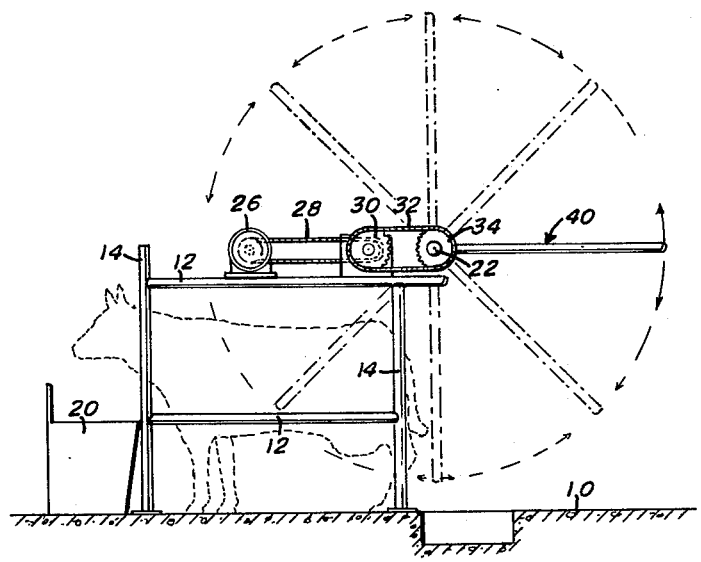
FIGURE 1 is an end elevational view showing a stall and the gate associated therewith.
Figure 2:
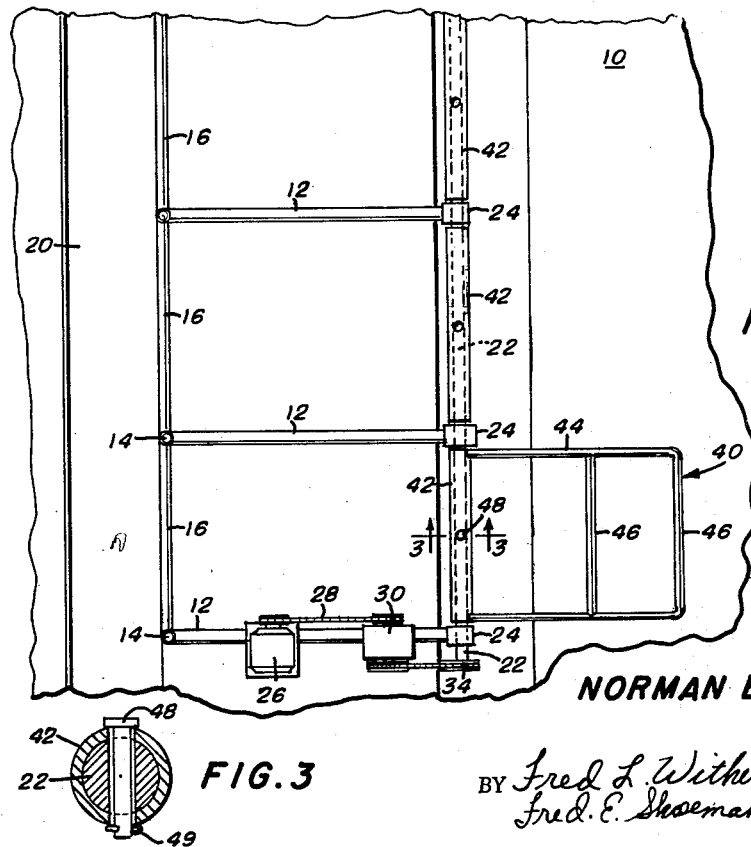
FIGURE 2 is a top plan view showing a plurality of stalls and the manner in which a gate is positioned.

The gate arrangement of this invention is adapted for use in a stall system having as many stalls as needed. The gates are mounted on a common horizontal drive shaft to which they may be selectively secured. The drive shaft is powered through an electric motor and gear reduction unit. The motor is of the reversible type so that the direction of rotation of the gate may be selected depending on whether the cow is entering or leaving the stall.

Referring to the invention in more detail as illustrated in the three figures of the drawing, the stalls are positioned on a concrete floor 10 and comprise longitudinal side bars 12, end vertical bars 14 and transverse stringers 16 which connect all of the stalls together at the forward top portion. A manger or feeding station 20 is located at the forward end of the stalls.

A horizontal drive shaft 22 is mounted on bearings 24 affixed to the vertical bars 14 at the point where they connect to the horizontal bars 12. A reversible electric motor 26 is suitably mounted on one of the upper longitudinal bars 12 and is connected by a chain 28 to gear reduction unit 30 also mounted on the bars 12 in alignment with the electric motor 26. A chain 32 connects the gear reduction unit 30 with sprocket 34 secured to drive shaft 22. Thus, power is furnished to drive shaft 22 by means of reversible electric motor 26 and gear reduction unit 30 through flexible power transmitting means.

Each gate 40 comprises a tubular member 42 which fits freely over shaft 22. A pair of rods 44 extend outwardly from the tubular member 42 and are connected by transverse bars 46 to form a closed rectangular framework constituting the gate 40.

Figure 3:
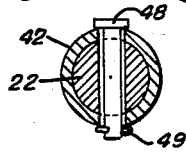
FIGURE 3 is an enlarged cross-sectional view taken along line 3—3 of FIGURE 2 showing the manner in which each stall gate is secured to the common rotating shaft for rotating the gates.

The gate 40 is secured to the drive shaft 22 by means of a retractable pin as illustrated in FIGURE 3. The drive shaft and tubular member 42 have registering holes drilled therethrough after which a locking pin 48 is introduced to connect the two members together. A retainer member 49 such as a cotter key may be used in the lower end of the pin 48 to retain same in place. Obviously, many other means could be used to secure the gate to the drive shaft. The only limitation on the device or means used is that it should be easily operated.

The operation of this gate system of this invention is now obvious, however, a brief description follows. With the cow in the stall the gate 40 is in the lower position, that is it extends vertically down generally in alignment with bars 14. When it is desired to release the cow from the stall the electric motor is energized so that power is furnished to drive shaft 22 in such direction as to cause the drive shaft to rotate counterclockwise. Thus, as the cow moves rearwardly in the stall towards the gate 40 it starts to swing rearwardly and upwardly so as to clear the cow. Continued rotation of the drive shaft swings the gate completely around, thus, assuring that the cow leaves the stall and, of course, once having left, the cow cannot re-enter the stall since the gate has then returned to its lower position, closing the stall.

When the cows are to enter the stalls, the motor direction is reversed and the stall gates are swung around clockwise so as to swing forward as the cow enters the stall and then come down behind the cow after complete entry into the stall.

If it is desired to keep certain stalls closed to either keep the animals in or to refuse entry the locking pin 48 is withdrawn and the gate will, of course, then remain in the lowermost position.

There are many types of controls that may be associated with the electric motor 26 for turning it on and off and such are readily available commercially. Also, the gates themselves may be made up in numerous types of structures to accomplish the same result. All of the above may be accomplished without departing from this invention.

I claim:

1. In a stall system having a plurality of stalls formed by parallel vertical partition frameworks interconnected at one end by horizontal transverse stringers to close off that end of the stalls and leave the other end open for entering and exiting and gate means for opening and closing the open end of the stalls, said gate means comprising a shaft rotatably mounted horizontally across the open ends of the stalls, said shaft being mounted at such a height that the opening is unobstructed for the necessary height depending on the animal using the stall, a gate mounted on said shaft in alignment with each stall, locking means for securing the gates to the shaft for rotation therewith, and reversible power means for selectively rotating the shaft to thereby swing the gates secured thereto through a complete 360° arc to open and then close each stall and subsequently reversed the direction of the gate movement to open and close the stall, the direction of rotation being controlled by whether the animal is entering or leaving the stall.

2. The invention as set forth in claim 1 and wherein the locking means for securing the gate to the shaft comprises individual locking members for each gate so that each gate may be selectively secured to the shaft thereby determining which stalls will be opened and closed when the shaft is rotated.

References Cited in the file of this patent
UNITED STATES PATENTS

| | | |
|---|---|---|
| 1,009,714 | Batchelder | Nov. 28, 1911 |
| 2,601,845 | Youngman | July 1, 1952 |